(12) United States Patent
Diao et al.

(10) Patent No.: US 9,007,725 B1
(45) Date of Patent: Apr. 14, 2015

(54) SENSOR WITH POSITIVE COUPLING BETWEEN DUAL FERROMAGNETIC FREE LAYER LAMINATES

(71) Applicant: Western Digital (Fremont), LLC, Fremont, CA (US)

(72) Inventors: Zhitao Diao, Fremont, CA (US); Yuankai Zheng, Fremont, CA (US); Christian Kaiser, San Jose, CA (US); Qunwen Leng, Palo Alto, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/508,697

(22) Filed: Oct. 7, 2014

(51) Int. Cl.
*G11B 5/39* (2006.01)
*G11B 5/60* (2006.01)

(52) U.S. Cl.
CPC ............ *G11B 5/3909* (2013.01); *G11B 5/6082* (2013.01)

(58) Field of Classification Search
USPC .................................................... 360/324.12
See application file for complete search history.

(56) References Cited

U.S. PATENT DOCUMENTS

| | | |
|---|---|---|
| 5,434,826 A | 7/1995 | Ravipati et al. |
| 5,576,914 A | 11/1996 | Rottmayer et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |

(Continued)

OTHER PUBLICATIONS

"Scissors-type Trilayer Giant Magnetoresistive Sensor using Heusler Alloy Ferromagnet for Narrow Reader of Ultrahigh Density Hard Disk Drives," National Institute for Materials Science, Oct. 31, 2011, pp. 1-3.

(Continued)

*Primary Examiner* — Mark Blouin

(57) ABSTRACT

A magnetic sensor includes first and second ferromagnetic free layers that are not magnetically pinned, and a non-magnetic spacer layer disposed between them. The first ferromagnetic free layer comprises a first plurality of ferromagnetic sub-layers that includes a first cobalt iron sub-layer that is in contact with the non-magnetic spacer layer, and a first amorphous cobalt boron sub-layer that is not in contact with the non-magnetic spacer layer. The second ferromagnetic free layer comprises a second plurality of ferromagnetic sub-layers that includes a second cobalt iron sub-layer that is in contact with the non-magnetic spacer layer, and a second amorphous cobalt boron sub-layer that is not in contact with the non-magnetic spacer layer. Each of the first and second cobalt iron sub-layers has a composition $Co_{(100-x)}Fe_{(x)}$ with x being in the range of 10 to 90 atomic percentage.

23 Claims, 7 Drawing Sheets

(56) References Cited

U.S. PATENT DOCUMENTS

| | | | |
|---|---|---|---|
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,466,418 B1 | 10/2002 | Horng et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |

(56) References Cited

U.S. PATENT DOCUMENTS

| | | |
|---|---|---|
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,747,853 B2 * | 6/2004 | Hayashi et al. .......... 360/324.12 |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,784,509 B2 * | 8/2004 | Yuasa et al. ............... 257/421 |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,914,759 B2 | 7/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,944,939 B2 | 9/2005 | Guo et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,016,166 B1 | 3/2006 | Hou et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,126,797 B2 | 10/2006 | Hasegawa et al. |
| 7,130,165 B2 | 10/2006 | Macken et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,155,810 B2 | 1/2007 | Pinarbasi |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,229,706 B2 | 6/2007 | Hasegawa et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,268,985 B2 | 9/2007 | Freitag et al. |
| 7,275,304 B2 | 10/2007 | Sakai et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,301,734 B2 | 11/2007 | Guo et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,428,124 B1 | 9/2008 | Song et al. |
| 7,430,098 B1 | 9/2008 | Song et al. |
| 7,432,574 B2 | 10/2008 | Nakamura et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,446,987 B2 | 11/2008 | Zhang et al. |
| 7,468,870 B2 | 12/2008 | Arasawa et al. |
| 7,493,688 B1 | 2/2009 | Wang et al. |
| 7,508,627 B1 | 3/2009 | Zhang et al. |
| 7,515,388 B2 | 4/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,599,158 B2 | 10/2009 | Wang et al. |
| 7,602,591 B2 | 10/2009 | Sbiaa et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,675,718 B2 | 3/2010 | Chang et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,746,602 B2 * | 6/2010 | Gill .......................... 360/324.12 |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,804,668 B2 | 9/2010 | Zhou et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,848,065 B2 | 12/2010 | Freitag et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,894,166 B2 | 2/2011 | Yamazaki et al. |
| 7,898,776 B2 | 3/2011 | Nakabayashi et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,929,258 B2 | 4/2011 | Xue et al. |
| 7,968,219 B1 | 6/2011 | Jiang et al. |
| 7,982,989 B1 | 7/2011 | Shi et al. |
| 8,008,912 B1 | 8/2011 | Shang |
| 8,011,084 B2 | 9/2011 | Le et al. |
| 8,012,804 B1 | 9/2011 | Wang et al. |
| 8,015,692 B1 | 9/2011 | Zhang et al. |
| 8,015,694 B2 | 9/2011 | Carey et al. |
| 8,018,677 B1 | 9/2011 | Chung et al. |
| 8,018,678 B1 | 9/2011 | Zhang et al. |
| 8,018,691 B2 | 9/2011 | Gill et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,107,202 B2 | 1/2012 | Lee et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,144,437 B2 | 3/2012 | Miyauchi et al. |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,247 B2 | 7/2012 | Carey et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |

(56) References Cited

U.S. PATENT DOCUMENTS

| | | |
|---|---|---|
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,553,369 B2 | 10/2013 | Song et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,609,262 B2 | 12/2013 | Horng et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,217 B1 | 3/2014 | Braganca et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2005/0275975 A1 | 12/2005 | Zhang et al. |
| 2006/0109592 A1 | 5/2006 | Watanabe et al. |
| 2010/0290157 A1 | 11/2010 | Zhang et al. |
| 2011/0026169 A1 | 2/2011 | Gill et al. |
| 2011/0086240 A1 | 4/2011 | Xiang et al. |
| 2011/0273802 A1 | 11/2011 | Zhou et al. |

(56) References Cited

U.S. PATENT DOCUMENTS

| | | |
|---|---|---|
| 2012/0104522 A1 | 5/2012 | Jung et al. |
| 2012/0111826 A1 | 5/2012 | Chen et al. |
| 2012/0129007 A1 | 5/2012 | Zheng et al. |
| 2012/0205758 A1 | 8/2012 | Jan et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0313191 A1 | 12/2012 | Whig et al. |
| 2013/0028013 A1 | 1/2013 | Ikeda et al. |
| 2013/0216702 A1 | 8/2013 | Kaiser et al. |
| 2013/0216863 A1 | 8/2013 | Li et al. |
| 2013/0230741 A1 | 9/2013 | Wang et al. |
| 2013/0257421 A1 | 10/2013 | Shang et al. |
| 2014/0002930 A1 | 1/2014 | Dimitrov et al. |
| 2014/0154529 A1 | 6/2014 | Yang et al. |
| 2014/0175050 A1 | 6/2014 | Zhang et al. |

OTHER PUBLICATIONS

"Scissors-type trilayer giant magnetoresistive sensor using heusler alloy ferromagnet," http://phys.org/news/2011-11-scissors-type-trilayer-giant-magnetoresistive-sensor.html, downloaded on Jul. 29, 2014, pp. 1-9.

Jian-Gang (Jimmy) Zhu, "New Heights for Hard Disk Drives," Department of Electrical and Computer Engineering and Data Storage Systems Center, Carnegie Mellon University, Jul. 2003, pp. 1-10.

Anup G. Roy, et al., U.S. Appl. No. 14/310,122, filed Jun. 20, 2014, 34 pages.

* cited by examiner

SENSOR WITH POSITIVE COUPLING BETWEEN DUAL FERROMAGNETIC FREE LAYER LAMINATES

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. A head that can read may be referred to as a "read head" herein, even if it includes other structures and functions such as a transducer for writing, a heater, microactuator, electronic lapping guide, laser diode, etc.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit. The plurality of HGAs are attached to various arms of the actuator.

Contemporary read heads typically include a read sensor (e.g. a tunneling magnetoresistive or so-called "giant" magnetoresistive read sensor) that is merged with an inductive write transducer to effect reading and writing from/to a recording media (e.g. disk or tape). Typically the read sensor includes a ferromagnetic "free layer" that has a magnetic orientation that changes relative to a ferromagnetic "pinned layer," due to externally applied magnetic fields from the recording media. The magnetic orientation of the pinned layer is fixed or pinned, so that the changes in magnetic orientation of the free layer are effectively changes in the relative magnetic orientation of the free layer and pinned layer. Typically, the free layer is separated from the pinned layer by a non-magnetic metallic spacer layer in the case of giant magnetoresistive (GMR) heads. Typically, the free layer is separated from the pinned layer by an insulative and typically ceramic barrier layer in the case of tunneling magnetoresistive (TMR) heads.

Recently, due to an industrial need for read sensors having increased sensitivity, there has been increased interest in read sensors having dual (or more) free layers separated by a spacer layer or barrier layer. In such dual read sensors, the magnetic orientation of each free layer may be biased so that it rotates oppositely from that of the free layer on the other side of the spacer or barrier layer, in response to an externally applied magnetic field from the recording media. Such opposite rotation has been termed as a so-called "scissor" mode of operation.

However, the performance of such dual free layer read sensors (e.g. the magnetoresistive ratio) depends upon the coupling between the free layers, their composition, and their internal structure. Hence, there is a need in the art for improved free layer compositions and structures that may provide or improve a desired free layer coupling and/or otherwise enhance the performance of dual free layer read sensors.

DESCRIPTION OF THE PREFERRED EMBODIMENTS

Figure 1:
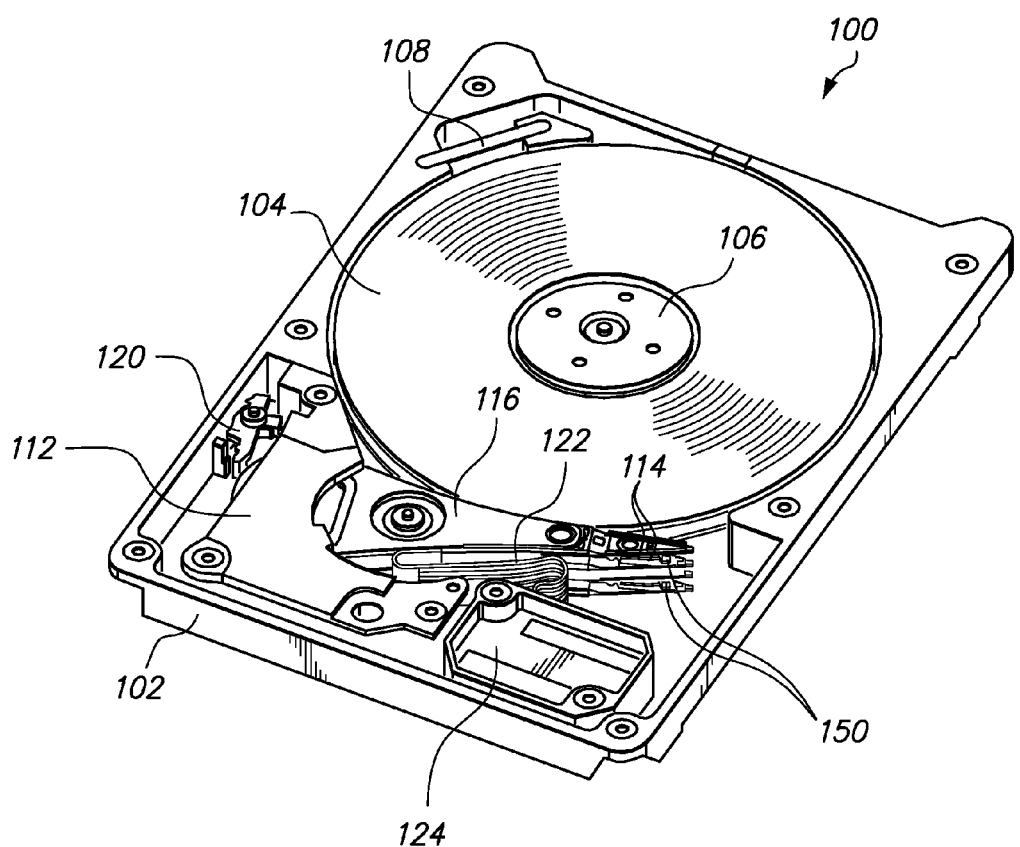
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is rotatably mounted on disk drive base 102. Voice coil motor 112 rotates the actuator 116 through a limited angular range so that at least one head gimbal assembly (HGA) 114 is desirably positioned relative to one or more tracks of information on a corresponding one of the disks 104. Each HGA 114 preferably includes a read head 150 for reading and writing from/to one of the disks 104. The actuator 116 may occasionally be latched at an extreme angular position within the limited angular range, by latch 120.

In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated. Electrical signals to/from the HGAs 114 are carried to other drive electronics via a flexible printed circuit that includes a flex cable 122 (preferably including a preamplifier circuit) and flex cable bracket 124.

Figure 2:
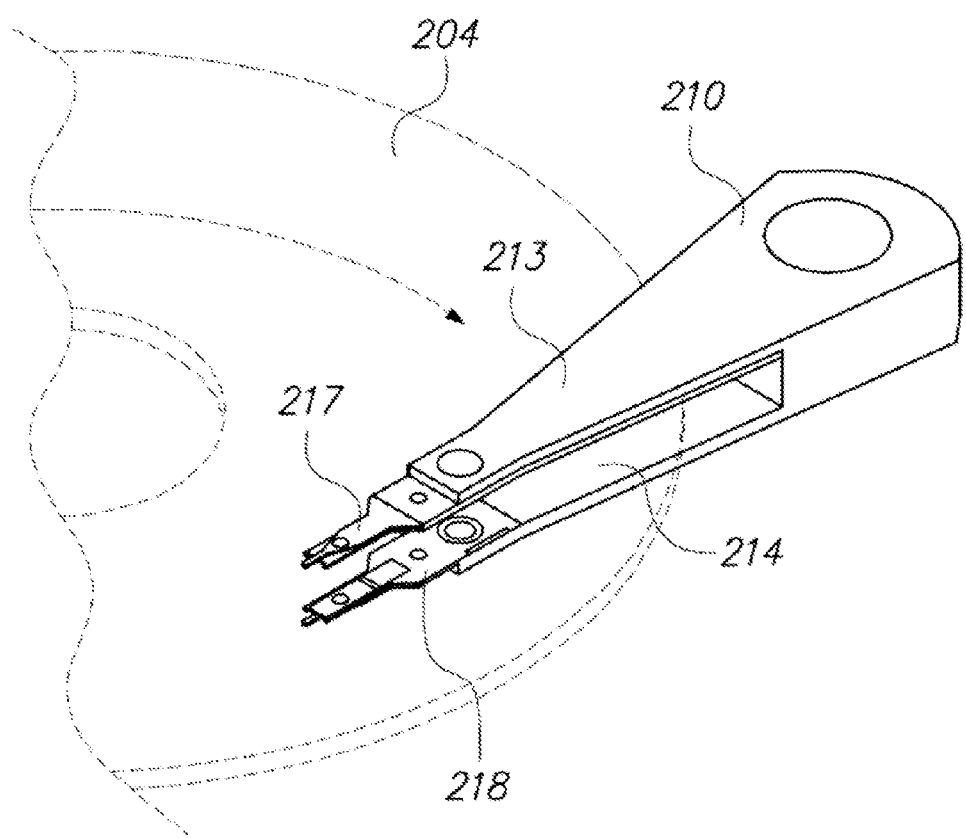
FIG. 2 is perspective view of a disk drive head actuator, capable of including an embodiment of the present invention.

FIG. 2 is perspective view of a disk drive head actuator 210, which has two arms 213, 214 disposed on opposite sides of a disk 204 (shown in phantom lines). Each of the actuator arms 213, 214 supports and positions one of the HGAs 217, 218 over each of the two opposing major surfaces of the disk 204. However, depopulated disk drives are also contemplated, having fewer HGAs than major disk surfaces.

Figure 3:
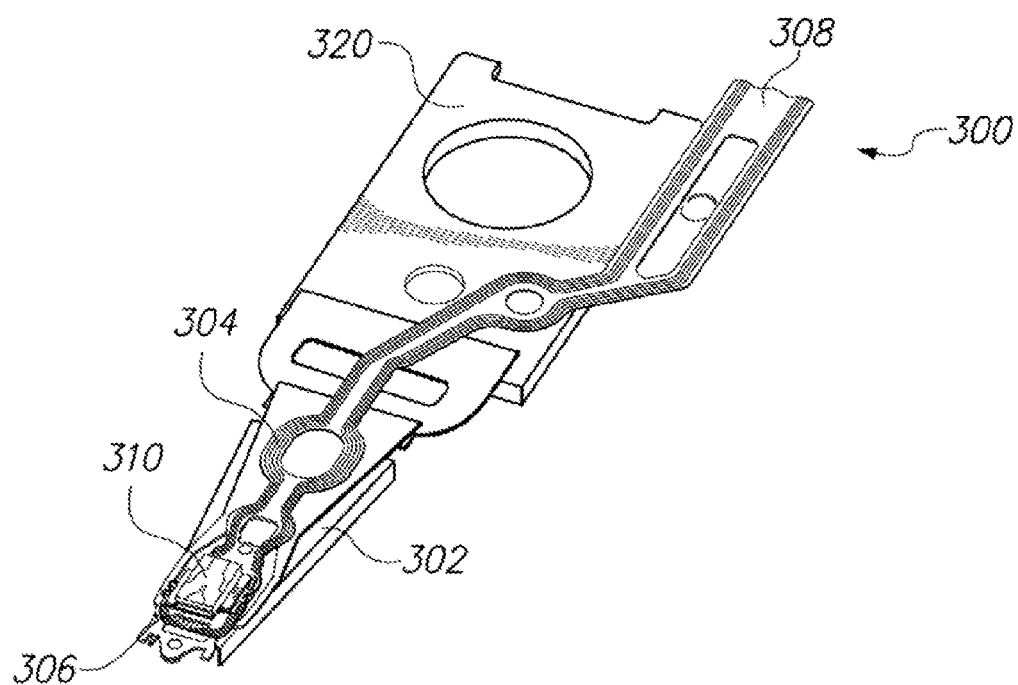
FIG. 3 is a bottom perspective view of an HGA, capable of including an embodiment of the present invention.

FIG. 3 is a bottom perspective view of an HGA 300, capable of including an embodiment of the present invention. The HGA 300 includes a load beam 302, and a read head 310 for reading and writing data from and to a magnetic disk (e.g. disk 104 of FIG. 1). The read head 310 of FIG. 3 includes a slider substrate having an air bearing surface (the label 310 points to this surface) and an opposing top surface (not visible because facing away from the viewer in FIG. 3). The slider substrate preferably comprises AlTiC, although another ceramic or silicon might also be used. The slider substrate of the read head 310 also includes a trailing face that includes a read transducer (too small to be visible in FIG. 3). The read head 310 may also include a write transducer that may be an inductive magnetic write transducer.

In FIG. 3, a first purpose of the load beam 302 may be to provide limited vertical compliance for the read head 310 to follow vertical undulations of the surface of a disk as it rotates. A second purpose of the load beam 302 may be to preload the air bearing surface of the read head 310 against an adjacent disk surface by a preload force that is commonly referred to as the "gram load." The HGA 300 may also include a laminated flexure 304. The laminated flexure 304 may include a tongue 306 to which the read head 310 is attached. For example, the read head 310 may be bonded to the tongue 306 of the laminated flexure 304 by an adhesive such as a UV cured epoxy, thermal set epoxy, epoxy doped with an electrically conductive filler, etc., or a conventional solder material. Only a portion of the tongue 306 is visible in the view of FIG. 3 because the read head 310 partially obscures it.

In the embodiment of FIG. 3, a first purpose of the laminated flexure 304 may be to provide compliance for the head 310 to follow pitch and roll angular undulations of the surface of the disk as it rotates, while restricting relative motion between the read head 310 and the load beam 302 in the lateral direction and about a yaw axis. A second purpose of the laminated flexure 304 may be to provide a plurality of electrical paths to facilitate signal transmission to/from the read head 310. For that second purpose, the laminated flexure 304 may include a plurality of electrically conductive traces that are defined in an electrically conductive (e.g. copper) sub-layer of the laminated flexure 304. The electrically conductive traces may be insulated from a support layer (e.g. stainless steel) by a dielectric layer (e.g. polyimide). The electrically conductive traces may extend away from the read head 310 along a flexure tail 308 of the laminated flexure 304, to reach a portion of the flex cable (not shown) that includes a preamplifier chip near the body of the actuator (e.g. actuator 116 of FIG. 1).

In the embodiment of FIG. 3, the load beam 302 is attached to a mounting plate 320. These components may be made of stainless steel, and their attachment to each other may be made by a plurality of spot welds, for example. In certain embodiments, the suspension assembly mounting plate 320 may include an annular swage boss to facilitate attachment of the suspension assembly to an actuator arm (e.g. an arm of the actuator arm 116 of FIG. 1) by the conventional attachment process known as swaging. In that case, the suspension assembly mounting plate 320 may also be referred to as a "swage mounting plate." The load beam 302, the laminated flexure 304 (without the read head 310), and the mounting plate 320, may together be referred to as a "suspension assembly." Once the read head 310 is added to the suspension assembly (e.g. by being bonded to the tongue 306 of the laminated flexure 304), the assembly may then be referred to as a HGA.

Figure 4:
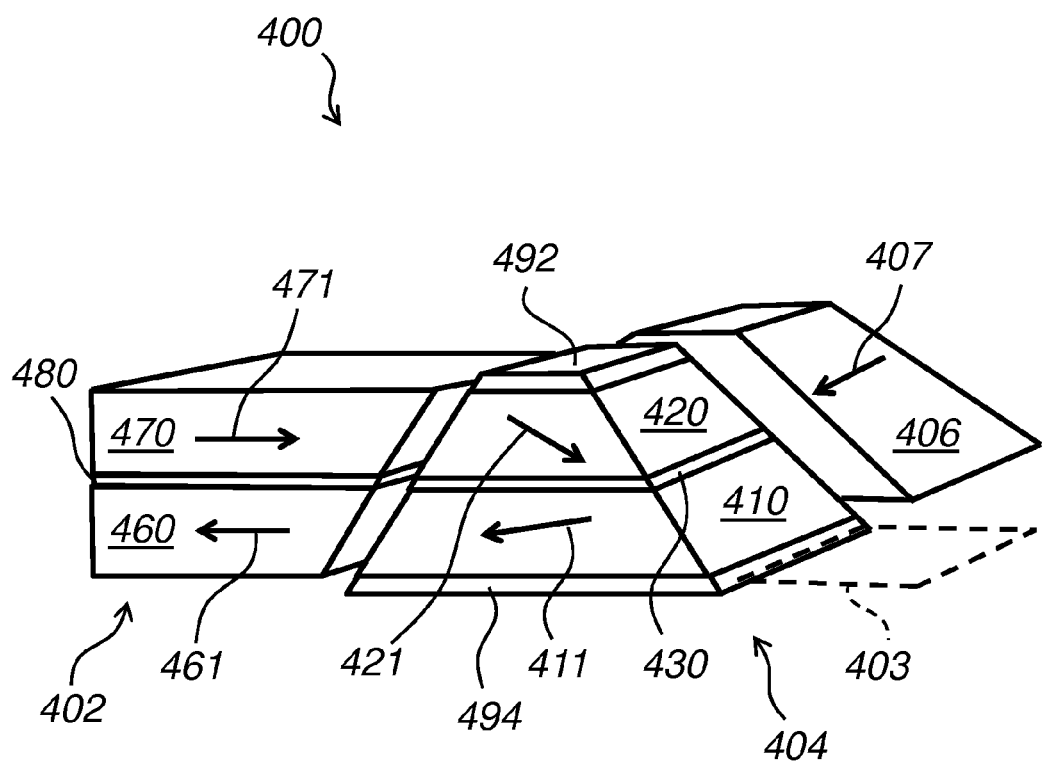
FIG. 4 is a schematic representation of a dual free layer read sensor and associated magnetic biasing structure, capable of including an embodiment of the present invention.

FIG. 4 is a simplified schematic representation of a dual free layer read sensor 400 capable of including an embodiment of the present invention, which includes a dual free layer sensor stack 404 and an adjacent soft biasing structure 402. Only half of the adjacent soft biasing structure 402 is shown in FIG. 4, so that the dual free layer sensor stack 404 can be more clearly depicted. However, another half of the adjacent soft biasing structure 402 preferably would be disposed over the footprint 403 shown in phantom (dashed) lines, opposite the dual free layer sensor stack 404 from the half of the adjacent soft biasing structure 402 that is shown in FIG. 4).

In the simplified schematic representation of FIG. 4, a magnetic hard biasing structure 406 is disposed behind the dual free layer sensor stack 404, with the recording media (not shown) disposed in front of the dual free layer sensor stack 404 (on the opposite side of the dual free layer sensor stack 404 than is the magnetic hard biasing structure 406). The recording media is not shown in FIG. 4 because it would obstruct the view of and obscure all else that is shown.

In the simplified schematic representation of FIG. 4, the dual free layer sensor stack 404 includes a first ferromagnetic free layer 410 and a second ferromagnetic free layer 420, separated by a nonmagnetic spacer or insulative barrier layer 430. The adjacent soft biasing structure 402 includes a first ferromagnetic soft bias layer 460 separated from a second ferromagnetic soft bias layer 470 by a nonmagnetic coupling layer 480 (e.g. a ruthenium layer).

In the simplified schematic representation of FIG. 4, a possible example direction of magnetization of each of the ferromagnetic layers is represented by an arrow. For example, an example direction of magnetization of the first ferromagnetic soft bias layer 460 is represented by the arrow 461, and an example direction of magnetization of the second ferromagnetic soft bias layer 470 is represented by the arrow 471. Since the first and second ferromagnetic soft bias layers 460 and 470 are antiferromagnetically coupled through the coupling layer 480 in the example of FIG. 4, the arrows 461 and 471 are pointed in opposite directions. Such antiferromagnetic coupling may also be referred to as negative coupling herein. By contrast, ferromagnetic coupling (i.e. positive coupling) would tend to cause the magnetization direction of the coupled layers to point in the same direction.

In the simplified schematic representation of FIG. 4, an example magnetization direction of the hard bias structure 406 is represented by the arrow 407 (which points towards the magnetic media in the representation of FIG. 4). An example direction of magnetization of the first ferromagnetic free layer 410 is represented by the arrow 411. An example direction of magnetization of the second ferromagnetic free layer 420 is represented by the arrow 421.

In the simplified schematic representation of FIG. 4, the first and second ferromagnetic free layers 410 and 420 are preferably ferromagnetically (i.e. positively) coupled through the spacer or barrier layer 430. Consequently, the directions 411 and 421 of the coupled free layers would tend towards being in the same direction (e.g. aligned with the magnetization direction 407 of the hard bias structure 406). However, the magnetic field from the soft bias structure 402 tends to skew the magnetization directions 411 and 421 of the first and second ferromagnetic free layers 410, 420, oppositely, so that they do not point in the same direction. In certain embodiments, the magnetization directions 411 and 421 of the first and second ferromagnetic free layers 410, 420 are preferably skewed by the hard and soft biasing structures to be orthogonal to each other in the quiescent state (i.e. in the absence of any external field applied from the media).

As a result of the difference in skew between the magnetization directions 411 and 421 of the first and second ferromagnetic free layers 410, 420, an external magnetic field applied from the media (towards or away from the hard bias structure 406) would tend to oppositely rotate the magnetization directions 411 and 421. Such opposite rotation in response to an external magnetic field applied from the media may be termed as a "scissor" mode of operation.

Note that in the simplified example of FIG. 4, it is contemplated that additional layers may be present in the dual free layer sensor stack 404. For example, the dual free layer sensor stack 404 may include a capping layer 492 and a buffer layer 494 (e.g. Ta, Ti, Cr, Ru, Hf, Cu, or Ag), and/or other layers in addition to the first and second ferromagnetic free layers 410, 420 and the spacer or barrier layer 430. However, the remainder of the description herein focuses on novel examples of the composition and structure of the first and second ferromagnetic free layers of a dual free layer read sensor, and the spacer or barrier layer between them, without excluding the possibility of existence of other layers.

Figure 5:
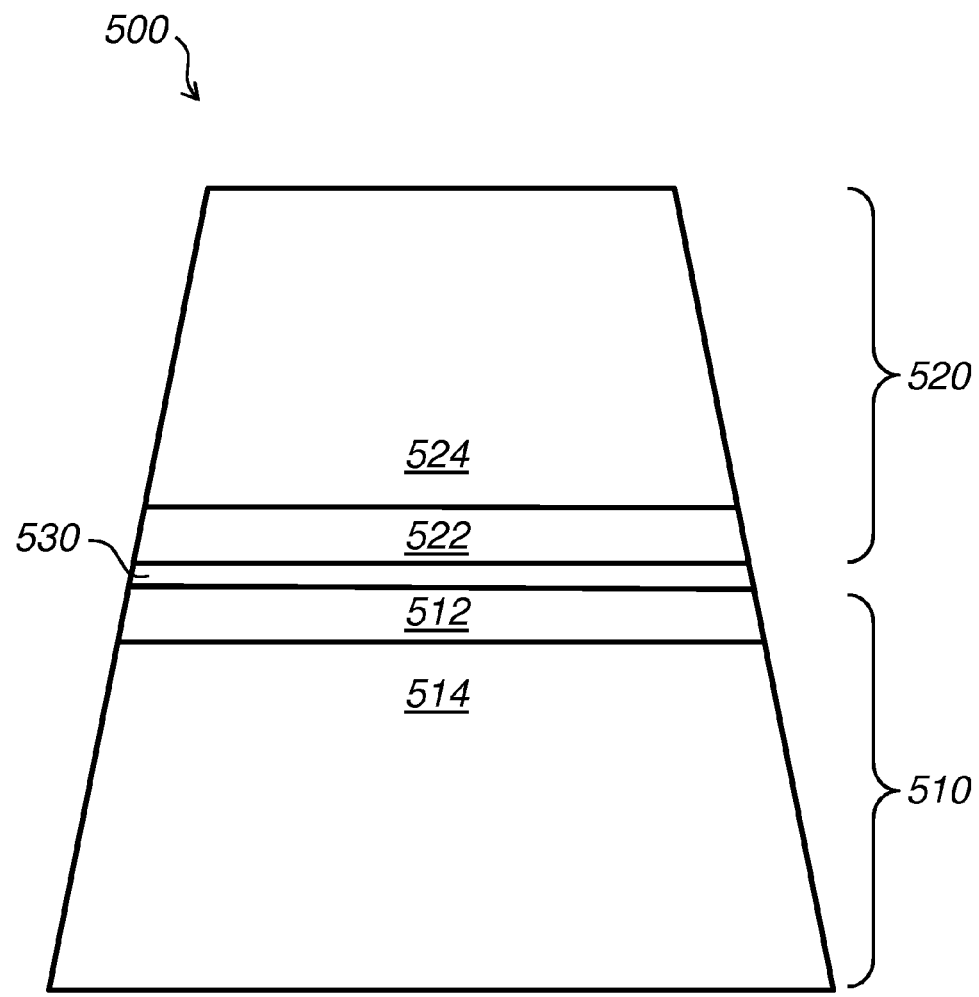
FIG. 5 depicts a dual free layer sensor laminate according to an embodiment of the present invention.

FIG. 5 depicts a dual free layer sensor laminate 500 according to an embodiment of the present invention. The dual free layer sensor laminate 500 includes a first ferromagnetic free layer 510 that is not magnetically pinned, and a second ferromagnetic free layer 520 that is not magnetically pinned. In certain embodiments, each of the first and second ferromagnetic free layers 510, 520 has a total thickness in the range of 10 to 100 Angstroms. In the embodiment of FIG. 5, the dual free layer sensor laminate 500 includes a non-magnetic spacer layer 530 disposed between the first and second ferromagnetic free layers 510, 520. In certain preferred embodiments, the first and second ferromagnetic free layers 510, 520 are positively (ferromagnetically) coupled, rather than being negatively (anti-ferromagnetically) coupled. Such desired coupling may be provided by the novel example laminates and sub-layer compositions described herein.

In certain giant magnetoresistive (GMR) embodiments, the non-magnetic spacer layer 530 may comprise a non-ferromagnetic metal (e.g. Cu, Ag, Au, Ta, Ru, Cr, or alloys thereof), and preferably have a thickness in the range of 5 to 100 Angstroms. In certain tunneling magnetoresistive (TMR) embodiments, the non-magnetic spacer layer 530 may comprise an insulative barrier layer (e.g. aluminum oxide, titanium oxide, or magnesium oxide), and preferably have a thickness in the range of 2.5 to 20 Angstroms.

In the embodiment of FIG. 5, the first ferromagnetic free layer 510 comprises a first plurality of ferromagnetic sub-layers that includes a first cobalt iron sub-layer 512 that is in contact with the non-magnetic spacer layer 530, and a first amorphous cobalt boron sub-layer 514 that is not in contact with the non-magnetic spacer layer 530. Likewise, the second ferromagnetic free layer 520 comprises a second plurality of ferromagnetic sub-layers that includes a second cobalt iron sub-layer 522 that is in contact with the non-magnetic spacer layer 530, and a second amorphous cobalt boron sub-layer 524 that is not in contact with the non-magnetic spacer layer 530.

In certain embodiments, each of the first and second amorphous cobalt boron sub-layers 514, 524 may have a composition $Co_{(100-y)}B_{(y)}$ with y preferably being in the range of 10 to 30 atomic percentage (e.g. 20%). In certain other embodiments, each of the first and second amorphous cobalt boron sub-layers 514, 524 may have a composition $Co_{(100-y-z)}Fe_{(z)}B_{(y)}$ with y preferably being in the range of 10 to 30 atomic percentage and z preferably being in the range of 5 to 60 atomic percentage. In certain embodiments, each of the first and second amorphous cobalt boron sub-layers 514, 524 may preferably have a thickness in the range of 5 to 100 Angstroms (e.g. 50 Angstroms).

In the embodiment of FIG. 5, each of the first and second cobalt iron sub-layers 512, 522 has a composition $Co_{(100-x)}Fe_{(x)}$ with x preferably being in the range of 10 to 90 atomic percentage (e.g. 70%). In certain embodiments, each of the first and second cobalt iron sub-layers 512, 522 may have a thickness that is preferably in the range of 3 to 20 Angstroms (e.g. most preferably in the range 4 to 7 Angstroms). In certain embodiments, the foregoing example laminate arrangement, and sub-layer thicknesses and/or compositions, may advantageously provide positive (ferromagnetic rather than anti-ferromagnetic) coupling between the first and second ferromagnetic free layers 510, 520 through the non-magnetic spacer layer 530.

Figure 6:
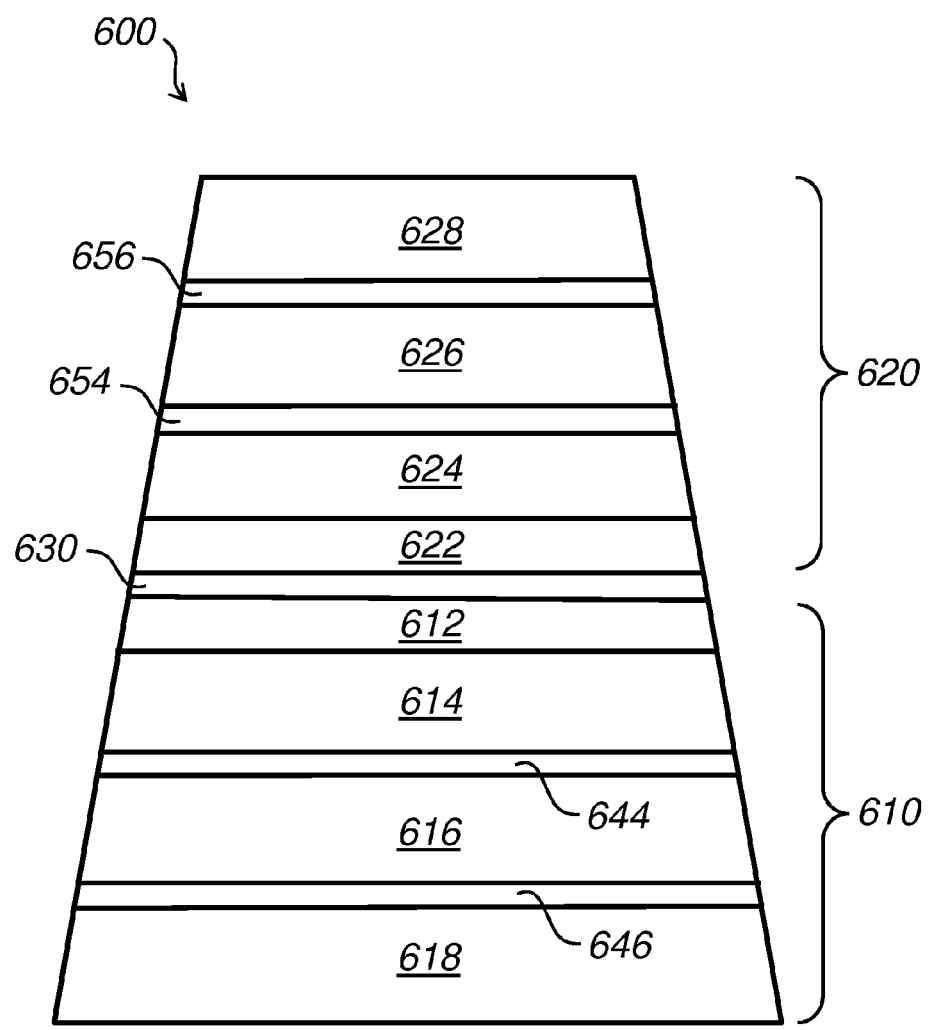
FIG. 6 depicts a dual free layer sensor laminate according to another embodiment of the present invention.

FIG. 6 depicts a dual free layer sensor laminate 600 according to another embodiment of the present invention. The dual free layer sensor laminate 600 includes a first ferromagnetic free layer 610 that is not magnetically pinned, and a second ferromagnetic free layer 620 that is not magnetically pinned. In certain embodiments, each of the first and second ferromagnetic free layers 610, 620 has a total thickness in the range of 10 to 100 Angstroms. In the embodiment of FIG. 6, the dual free layer sensor laminate 600 includes a non-magnetic spacer layer 630 disposed between the first and second ferromagnetic free layers 610, 620. In certain preferred embodiments, the first and second ferromagnetic free layers 610, 620 are positively (ferromagnetically) coupled, rather than being negatively (anti-ferromagnetically) coupled.

In certain GMR embodiments, the non-magnetic spacer layer 630 may comprise a non-ferromagnetic metal (e.g. Cu, Ag, Au, Ta, Ru, Cr, or alloys thereof), and preferably have a thickness in the range of 5 to 100 Angstroms. In certain TMR embodiments, the non-magnetic spacer layer 630 may comprise an insulative barrier layer (e.g. aluminum oxide, titanium oxide, or magnesium oxide), and preferably have a thickness in the range of 2.5 to 20 Angstroms.

In the embodiment of FIG. 6, the first ferromagnetic free layer 610 comprises a first plurality of ferromagnetic sub-layers that includes a first cobalt iron sub-layer 612 that is in contact with the non-magnetic spacer layer 630, and three amorphous cobalt boron sub-layers 614, 616, and 618 that are not in contact with the non-magnetic spacer layer 630. Likewise, the second ferromagnetic free layer 620 comprises a second plurality of ferromagnetic sub-layers that includes a second cobalt iron sub-layer 622 that is in contact with the non-magnetic spacer layer 630, and three amorphous cobalt boron sub-layers 624, 626, and 628 that are not in contact with the non-magnetic spacer layer 630.

In certain embodiments, each of the amorphous cobalt boron sub-layers 614, 616, 618, 624, 626, and 628 may have a composition $Co_{(100-y)}B_{(y)}$ with y preferably being in the range of 10 to 30 atomic percentage (e.g. 20%). In certain other embodiments, each of the amorphous cobalt boron sub-layers 614, 616, 618, 624, 626, and 628 may have a composition $Co_{(100-y-z)}Fe_{(z)}B_{(y)}$ with y preferably being in the range of 10 to 30 atomic percentage and z preferably being in the range of 5 to 60 atomic percentage. In certain embodiments, each of the amorphous cobalt boron sub-layers 614, 616, 618, 624, 626, and 628 may preferably have a thickness in the range of 5 to 100 Angstroms (e.g. most preferably in the range 15 to 19 Angstroms).

In the embodiment of FIG. 6, the amorphous cobalt boron sub-layers 614, 616, 618, 624, 626, and 628 alternate with dusting layers 644, 646, 654, and 656. That is, dusting layer 644 is disposed between the amorphous cobalt boron sub-layers 614 and 616, and dusting layer 646 is disposed between the amorphous cobalt boron sub-layers 616 and 618. Likewise, dusting layer 654 is disposed between the amorphous cobalt boron sub-layers 624 and 626, and dusting layer 656 is disposed between the amorphous cobalt boron sub-layers 626 and 628.

In certain embodiments, each of the dusting layers 644, 646, 654, and 656 comprises ruthenium. In certain other embodiments, each of the dusting layers 644, 646, 654, and 656 comprises nickel iron having a composition $Ni_{(100-z)}Fe_{(z)}$ with z being in the range of 3 to 10 atomic percentage (e.g. 5%). Each of the dusting layers 644, 646, 654, and 656 may preferably have a dusting layer thickness in the range of 0.5 to 10 Angstroms (e.g. 2 Angstroms).

In the embodiment of FIG. 6, each of the first and second cobalt iron sub-layers 612, 622 has a composition $Co_{(100-x)}Fe_{(x)}$ with x preferably being in the range of 10 to 90 atomic percentage (e.g. 70%). In certain embodiments, each of the first and second cobalt iron sub-layers 612, 622 may preferably have a thickness in the range of 3 to 20 Angstroms (e.g. most preferably in the range 4 to 7 Angstroms). In certain embodiments, the foregoing example laminate arrangement, and sub-layer thicknesses and/or compositions, may advantageously provide positive (ferromagnetic rather than anti-ferromagnetic) coupling between the first and second ferromagnetic free layers 610, 620 through the non-magnetic spacer layer 630.

Figure 7:
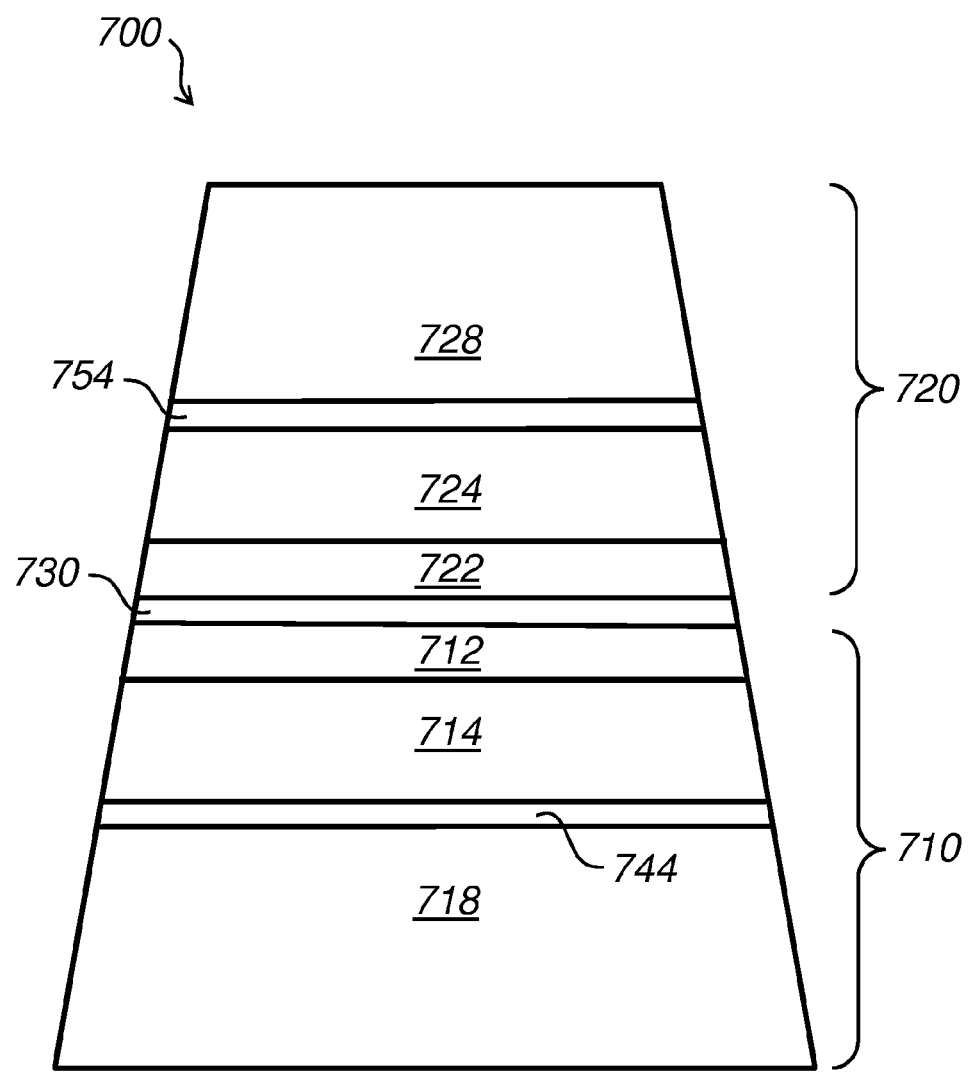
FIG. 7 depicts a dual free layer sensor laminate according to another embodiment of the present invention.

FIG. 7 depicts a dual free layer sensor laminate 700 according to another embodiment of the present invention. The dual free layer sensor laminate 700 includes a first ferromagnetic free layer 710 that is not magnetically pinned, and a second ferromagnetic free layer 720 that is not magnetically pinned. In certain embodiments, each of the first and second ferromagnetic free layers 710, 720 has a total thickness in the range of 10 to 100 Angstroms. In the embodiment of FIG. 7, the dual free layer sensor laminate 700 includes a non-magnetic spacer layer 730 disposed between the first and second ferromagnetic free layers 710, 720. In certain preferred embodiments, the first and second ferromagnetic free layers 710, 720 are positively (ferromagnetically) coupled, rather than being negatively (anti-ferromagnetically) coupled. In certain GMR embodiments, the non-magnetic spacer layer 730 may comprise a non-ferromagnetic metal (e.g. Cu, Ag, Au, Ta, Ru, Cr, or alloys thereof), and preferably have a thickness in the range of 5 to 100 Angstroms.

In certain TMR embodiments, the non-magnetic spacer layer 730 is an insulative barrier layer (e.g. aluminum oxide, titanium oxide, or magnesium oxide), and preferably has a thickness in the range of 2.5 to 20 Angstroms. In such TMR embodiments the insulative barrier layer 730 may be formed by natural oxidation of a metal (e.g. magnesium) in a low-pressure atmosphere (e.g. ~0.5 mTorr) of $O_2$ or $Ar/O_2$ mixture (e.g. 9:1 mixture of argon and oxygen). Specifically, upon completion of the deposition of the first ferromagnetic free layer 710, iterative cycles of metal deposition and oxidation may be employed to form the insulating barrier 730. The insulating barrier 730 may then be in-situ annealed at an intermediate temperature for a short time (e.g. 200° C. for 5 min). After heat treatment, a thin metal layer of the like (e.g. 1.5 Angstrom layer of magnesium) may be added to the insulative barrier layer 730 to cap it. Next, the insulating barrier 730 may be cooled down to a well below room temperature (e.g. 120° K). Such cooling may facilitate subsequent deposition of the second ferromagnetic free layer 720 by altering bulk and surface properties and temperature of the insulating barrier 730 upon which the second ferromagnetic free layer 720 is grown. In certain embodiments, this process may enhance the interlayer coupling between the first and second ferromagnetic free layers 710 and 720, and/or beneficially increase the tunneling magnetoresistive ratio.

In the embodiment of FIG. 7, the first ferromagnetic free layer 710 comprises a first plurality of ferromagnetic sub-layers that includes a first cobalt iron sub-layer 712 that is in contact with the non-magnetic spacer layer 730, a first amorphous cobalt boron sub-layer 714 that is not in contact with the non-magnetic spacer layer 730, a NiFe layer 718, and a dusting layer 744 that is disposed between the NiFe layer 718 and the first amorphous cobalt boron sub-layer 714. Likewise, the second ferromagnetic free layer 720 comprises a second plurality of ferromagnetic sub-layers that includes a second cobalt iron sub-layer 722 that is in contact with the non-magnetic spacer layer 730, and a second amorphous cobalt boron sub-layer 724 that is not in contact with the non-magnetic spacer layer 730, a NiFe layer 728, and a dusting layer 754 that is disposed between the NiFe layer 728 and the second amorphous cobalt boron sub-layer 724.

In certain embodiments, each of the first and second amorphous cobalt boron sub-layers 714, 724 may have a composition $Co_{(100-y)}B_{(y)}$ with y preferably being in the range of 10 to 30 atomic percentage (e.g. 20%). In certain other embodiments, each of the first and second amorphous cobalt boron sub-layers 714, 724 may have a composition $Co_{(100-y-z)}Fe_{(z)}B_{(y)}$ with y preferably being in the range of 10 to 30 atomic percentage and z preferably being in the range of 5 to 60 atomic percentage. In certain embodiments, each of the first and second amorphous cobalt boron sub-layers 714, 724 may preferably have a thickness in the range of 5 to 100 Angstroms (e.g. 20 Angstroms).

In certain embodiments, each of the dusting layers 744 and 754 comprises iron or tantalum, and preferably has a dusting layer thickness in the range of 0.5 to 10 Angstroms (e.g. 2 Angstroms). In certain embodiments, each of the NiFe layers 718 and 728 is composed predominantly of nickel and has a thickness in the range of 30 to 70 Angstroms (e.g. 50 Angstroms).

In the embodiment of FIG. 7, each of the first and second cobalt iron sub-layers 712, 722 has a composition $Co_{(100-x)}Fe_{(x)}$ with x preferably being in the range of 10 to 90 atomic percentage (e.g. 70%). In certain embodiments, each of the first and second cobalt iron sub-layers 712, 722 may have a thickness that is preferably in the range of 3 to 20 Angstroms (e.g. 4 Angstroms). In certain embodiments, the foregoing example laminate arrangement, and sub-layer thicknesses and/or compositions, may advantageously provide positive (ferromagnetic rather than anti-ferromagnetic) coupling between the first and second ferromagnetic free layers 710, 720 through the non-magnetic spacer layer 730.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. The drawings are not necessarily to scale. "Comprising," "including," and "having," are intended to be open-ended terms.

What is claimed is:

1. A magnetic sensor comprising:
   a first ferromagnetic free layer that is not magnetically pinned;
   a second ferromagnetic free layer that is not magnetically pinned;
   a non-magnetic spacer layer disposed between the first and second ferromagnetic free layers;
   wherein the first ferromagnetic free layer comprises a first plurality of ferromagnetic sub-layers that includes a first cobalt iron sub-layer that is in contact with the non-magnetic spacer layer, and a first amorphous cobalt boron sub-layer that is not in contact with the non-magnetic spacer layer; and
   wherein the second ferromagnetic free layer comprises a second plurality of ferromagnetic sub-layers that includes a second cobalt iron sub-layer that is in contact with the non-magnetic spacer layer, and a second amorphous cobalt boron sub-layer that is not in contact with the non-magnetic spacer layer;

wherein each of the first and second cobalt iron sub-layers has a composition $Co_{(100-x)}Fe_{(x)}$ with x being in the range of 10 to 90 atomic percentage.

2. The magnetic sensor of claim 1 wherein the first and second ferromagnetic free layers are ferromagnetically coupled.

3. The magnetic sensor of claim 1 wherein the first ferromagnetic free layer has a first magnetization direction, and the second ferromagnetic free layer has a second magnetization direction, and the first and second magnetization directions are substantially orthogonal in a quiescent state.

4. The magnetic sensor of claim 1 wherein the non-magnetic spacer layer comprises a non-ferromagnetic metal having a thickness in the range of 5 to 100 Angstroms and selected from the group consisting of Cu, Ag, Au, Ta, Ru, and Cr.

5. The magnetic sensor of claim 1 wherein the non-magnetic spacer layer comprises an insulative barrier layer having a thickness in the range of 2.5 to 20 Angstroms.

6. The magnetic sensor of claim 5 wherein the insulative barrier layer comprises aluminum oxide, titanium oxide, or magnesium oxide.

7. The magnetic sensor of claim 1 wherein each of the first and second amorphous cobalt boron sub-layers has a composition $Co_{(100-y)}B_{(y)}$ with y being in the range of 10 to 30 atomic percentage.

8. The magnetic sensor of claim 1 wherein each of the first and second amorphous cobalt boron sub-layers has a composition $Co_{(100-y-z)}Fe_{(z)}B_{(y)}$ with y being in the range of 10 to 30 atomic percentage and z being in the range of 5 to 60 atomic percentage.

9. The magnetic sensor of claim 1 wherein each of the first and second pluralities of ferromagnetic sub-layers includes alternating amorphous cobalt boron sub-layers and ruthenium dusting layers, the ruthenium dusting layers each having a thickness in the range of 0.5 to 10 Angstroms.

10. The magnetic sensor of claim 1 wherein each of the first and second pluralities of ferromagnetic sub-layers includes alternating amorphous cobalt boron sub-layers and dusting layers of nickel iron, the dusting layers of nickel iron each having a thickness in the range of 0.5 to 10 Angstroms and a composition $Ni_{(100-z)}Fe_{(z)}$ with z being in the range of 3 to 10 atomic percentage.

11. The magnetic sensor of claim 1 wherein each of the first and second cobalt iron sub-layers has a thickness in the range of 3 to 20 Angstroms.

12. The magnetic sensor of claim 1 wherein each of the first and second amorphous cobalt boron sub-layers has a thickness in the range of 5 to 100 Angstroms.

13. The magnetic sensor of claim 1 wherein each of the first and second ferromagnetic free layers has a total thickness in the range of 10 to 100 Angstroms.

14. A magnetic head comprising:
a slider having an air bearing surface (ABS) that lies in an ABS plane, and having a trailing face approximately orthogonal to the ABS plane, the slider defining a longitudinal axis normal to the trailing face and defining a vertical axis normal to the ABS plane, and defining a lateral axis that is normal to both the longitudinal axis and the vertical axis;
a magnetic sensor disposed on the trailing face, the magnetic sensor comprising
a first ferromagnetic free layer that is not magnetically pinned;
a second ferromagnetic free layer that is not magnetically pinned;
a non-magnetic spacer layer disposed between the first and second ferromagnetic free layers;
wherein the first ferromagnetic free layer comprises a first plurality of ferromagnetic sub-layers that includes a first cobalt iron sub-layer that is in contact with the non-magnetic spacer layer, and a first amorphous cobalt boron sub-layer that is not in contact with the non-magnetic spacer layer; and
wherein the second ferromagnetic free layer comprises a second plurality of ferromagnetic sub-layers that includes a second cobalt iron sub-layer that is in contact with the non-magnetic spacer layer, and a second amorphous cobalt boron sub-layer that is not in contact with the non-magnetic spacer layer;
wherein each of the first and second cobalt iron sub-layers has a composition $Co_{(100-x)}Fe_{(x)}$ with x being in the range of 10 to 90 atomic percentage;
two antiferromagnetically coupled soft bias layers disposed laterally adjacent to the magnetic sensor; and
a hard magnet disposed vertically adjacent to the magnetic sensor and further from the ABS plane than is the sensor.

15. The magnetic head of claim 14 wherein the first ferromagnetic free layer has a first magnetization direction, and the second ferromagnetic free layer has a second magnetization direction, and the first and second magnetization directions are substantially orthogonal in a quiescent state.

16. The magnetic head of claim 14 wherein the non-magnetic spacer layer comprises an insulative barrier layer including aluminum oxide, titanium oxide, or magnesium oxide.

17. The magnetic head of claim 14 wherein each of the first and second amorphous cobalt boron sub-layers has a composition $Co_{(100-y)}B_{(y)}$ with y being in the range of 10 to 30 atomic percentage.

18. The magnetic head of claim 14 wherein each of the first and second amorphous cobalt boron sub-layers has a composition $Co_{(100-y-z)}Fe_{(z)}B_{(y)}$ with y being in the range of 10 to 30 atomic percentage and z being in the range of 5 to 60 atomic percentage.

19. The magnetic head of claim 14 wherein each of the first and second pluralities of ferromagnetic sub-layers includes alternating amorphous cobalt boron sub-layers and ruthenium dusting layers, the ruthenium dusting layers each having a thickness in the range of 0.5 to 10 Angstroms.

20. The magnetic head of claim 14 wherein each of the first and second pluralities of ferromagnetic sub-layers includes alternating amorphous cobalt boron sub-layers and dusting layers of nickel iron, the dusting layers of nickel iron each having a thickness in the range of 0.5 to 10 Angstroms and a composition $Ni_{(100-z)}Fe_{(z)}$ with z being in the range of 3 to 10 atomic percentage.

21. The magnetic head of claim 14 wherein each of the first and second cobalt iron sub-layers has a thickness in the range of 3 to 20 Angstroms.

22. The magnetic head of claim 14 wherein each of the first and second amorphous cobalt boron sub-layers has a thickness in the range of 5 to 100 Angstroms.

23. A disk drive comprising:
a disk drive base;
a spindle attached to the disk drive base and defining a spindle axis of rotation;
a disk rotatably mounted on the spindle;
a head actuator attached to the disk drive base;
a magnetic head attached to the head actuator; the magnetic head comprising a slider having an air bearing surface (ABS) that faces the disk and lies in an ABS plane, and having a trailing face approximately orthogonal to the ABS plane, the slider defining a longitudinal axis normal to the trailing face and defining a vertical axis normal to the ABS plane and approximately parallel to the spindle axis of rotation, and defining a lateral axis that is normal to both the longitudinal axis and the vertical axis;

a magnetic sensor disposed on the trailing face, the magnetic sensor comprising
- a first ferromagnetic free layer that is not magnetically pinned;
- a second ferromagnetic free layer that is not magnetically pinned;
- a non-magnetic spacer layer disposed between the first and second ferromagnetic free layers;
- wherein the first ferromagnetic free layer comprises a first plurality of ferromagnetic sub-layers that includes a first cobalt iron sub-layer that is in contact with the non-magnetic spacer layer, and a first amorphous cobalt boron sub-layer that is not in contact with the non-magnetic spacer layer; and
- wherein the second ferromagnetic free layer comprises a second plurality of ferromagnetic sub-layers that includes a second cobalt iron sub-layer that is in contact with the non-magnetic spacer layer, and a second amorphous cobalt boron sub-layer that is not in contact with the non-magnetic spacer layer;
- wherein each of the first and second cobalt iron sub-layers has a composition $Co_{(100-x)}Fe_{(x)}$ with x being in the range of 10 to 90 atomic percentage;

two antiferromagnetically coupled soft bias layers disposed laterally adjacent to the magnetic sensor; and a hard magnet disposed vertically adjacent to the magnetic sensor and further from the ABS plane than is the sensor.

* * * * *